United States Patent [19]

Myslinski

[11] Patent Number: 4,736,378
[45] Date of Patent: Apr. 5, 1988

[54] INTEGRATED ACOUSTO-OPTIC MODE LOCKING DEVICE FOR A MODE LOCKED LASER SYSTEM

[75] Inventor: Piotr Myśliński, Warsaw, Poland

[73] Assignee: Uniwersytet Warszawski, Warsaw, Poland

[21] Appl. No.: 873,411

[22] Filed: Jun. 12, 1986

[51] Int. Cl.⁴ .............................................. H01S 3/098
[52] U.S. Cl. ........................................ 372/18; 372/13; 372/100; 372/92; 372/33; 372/34
[58] Field of Search .................. 372/13, 18, 12, 9, 26, 372/92, 97, 33, 34

[56] References Cited

U.S. PATENT DOCUMENTS

| | | | |
|---|---|---|---|
| 3,644,842 | 2/1972 | Uchida et al. | 372/18 |
| 3,959,740 | 5/1976 | Dewhirst | 372/12 |
| 3,982,203 | 9/1976 | de Wit | 372/13 |
| 4,291,282 | 9/1981 | Alfano et al. | 372/18 |
| 4,308,506 | 12/1981 | Ellis | 372/13 |

OTHER PUBLICATIONS

Klann et al.; "Highly Stable Acousto-Optic Mode-Cocking Using Active Feedback"; Opt. Comm.; vol. 38, No. 5, 6, 1 Sep. 1981.
"Design of an Acousto-Optic Modulator and Driver", Kenneth G. Spears & James Larsen, Rev. Sci. Instrum., vol. 48, No. 4, Apr. 1977.
"Picosecond System", Coherent Laser Division, 1980.
"Spectra-Physics Pulsed Laser Systems", Spectra-Physics Laser Products Division, 1985.
"Integrated Acousto-Optic Mode Locker", Petr Myslinski, Rev. Sci. Instrum., 57, Nov. 1986.

Primary Examiner—Léon Scott, Jr.
Attorney, Agent, or Firm—Ladas & Parry

[57] ABSTRACT

The subject of the invention is a device synchronizing modes of the laser, fastened in its resonance cavity, in a housing 1 having its inner temperature stabilized, which contains an acousto-optical modulator whose buffer 5, functioning at the same time as a prism, together with a transducer 13 generating an acoustic wave for modulation of a light wave and with a back mirror 11 form an integrated optical element in the form of a prism with a trapezoid base.

6 Claims, 1 Drawing Sheet

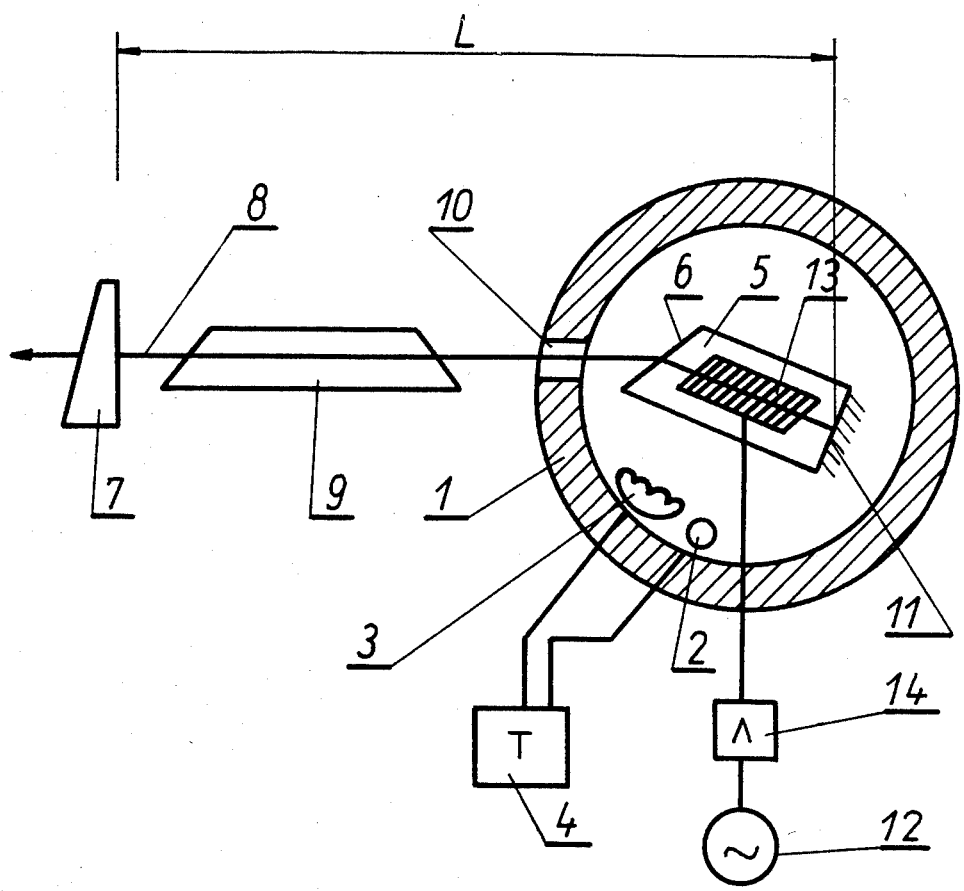

INTEGRATED ACOUSTO-OPTIC MODE LOCKING DEVICE FOR A MODE LOCKED LASER SYSTEM

FIELD OF THE INVENTION

The subject of the invention is a device synchronizing modes of the laser, fastened in its resonance cavity, in a housing having its inner temperature stabilized, in which an acousto-optical modulator is located.

Synchronization of laser modes consists in modulation of the light wave amplitude in the resonator of the laser at the frequency corresponding to the frequency difference between the neighbouring longitudinal modes of the resonator or the total multiple of the said difference. Modulation of the light wave amplitude is based on diffraction of the said wave on a standing ultrasonic wave. The light wave, coming out from the input mirror, passes through an amplifying medium and through a modulator to the back mirror.

BACKGROUND OF THE INVENTION

Those skilled in the art known from the patent application No. P 243930 a device synchronizing modes of the laser, fastened in its resonance cavity in the way enabling the adjustment of the length of the resonator, that is, the distance between the input mirror and the back mirror, consisting of a housing having its inner temperature stabilized, in which an acousto-optical modulator is located, the said modulator being composed of two parts, whereof one is a buffer, preferably a quartz one in the form of a parallelepiped, and the other one is a transducer generating a standing acoustic wave for modulation of the light wave, the said transducer being built in the said buffer and controlled by a frequency synthesizer and connected with the said synthesizer through the intermediary of an amplifier. The housing of the known device contains also a heating element and a sensing element co-operating with the temperature stabilizer.

The inconvenience of application of this known device results from its complicated design making it difficult to adjust the particular, separately mounted, elements of the resonator of the laser.

SUMMARY OF THE INVENTION

The object of the invention is to work out a device of a simpler design and being at the same time more precise and more easily adjustable, which could co-operate with lasers in use.

So, the essence of the invention consists in integrating into one optical element a prism, a buffer, a modulator and a back mirror.

The device according to the invention, synchronizing modes of the laser, is fastened in its resonance cavity in the way enabling the adjustment of the length of the resonator, that is, the distance between the input mirror and the back mirror, and consists of a housing having its inner temperature stabilized, in which an acousto-optical modulator is located, the said modulator being composed of a buffer, preferably a quartz one, cut out and set in such a way that reflection intensity of a laser beam on its surface is equal to zero, and in the said buffer a transducer generating a standing acoustic wave for modulation of a light wave is built in, the said transducer being controlled by a frequency synthesizer and connected with the said synthesizer through the intermediary of an amplifier. The device according to the invention is characterized by that the buffer, functioning at the same time as a prism, together with the transducer and the back mirror form one integrated optical element in the form of a prism with a trapezoid base.

An advantage of the device according to the invention is simplicity of its design and easiness of its tuning, because this is carried out by changing the position of only one integrated element.

The device may be easily built in lasers operating on many or on one spectral line.

BRIEF DESCRIPTION OF THE DRAWINGS

The sole FIGURE is a schematic drawing of a preferred embodiment of the invention.

DETAILED DESCRIPTION OF A PREFERRED EMBODIMENT

In a resonance cavity of a continuous-operation argon laser working on blue-green lines a device is built-in, which consists of a housing 1 in the form of a section of a round tube which contains a sensing element 2 and a heating set 3 connected with a circuit 4 stabilizing the temperature. The heating set 3 encircles an acousto-optical modulator being a quartz buffer 5 in the form of a prism with a trapezoid base, whose front wall 6 from the side of an input mirror 7 is inclined to the direction of the path of the light wave 8 passing between the input mirror 7 and the buffer 5 through an amplifying medium 9 and a hole 10 in the housing 1, and then through the buffer 5 to the front wall, from the side opposite to the input mirror 7, being the back mirror 11. In the quartz buffer 5 a transducer 13 is built in, controlled by a frequency synthesizer 12 and connected with the said synthesizer through the intermediary of an amplifier 14.

By using the device according to the invention stable pulses were obtained, having the duration of 200 ps and the repetition rate of 120 MHz. The highest power was obtained for the line of 514 mm.

Due to the short pulse duration the device makes it possible to investigate rapid atomic and molecular processes or the processes proceeding in solid-state physics, and at the same time high power of pulses makes it possible to apply the device for research in the field of non-linear optics.

What is claimed is:

1. An integrated acousto-optic mode locker comprising: a laser medium having first and second ends and a longitudinal axis; an excitation source for producing a population inversion in said medium;

an acousto-optic modulator mounted along the longitudinal axis of the laser medium and placed in close proximity to a first end of the laser medium, said acousto-optic modulator including an acoustic-wave and laser light-wave transmitting material, an acoustic-wave generating mechanism connected to said acoustic-wave transmiting material for generating an acoustic standing wave in said material to lock oscillation modes of the laser, said acoustic wave generating mechanism comprising a transducer for converting an electrical signal to an acoustic wave in said acoustic wave transmitting material and further including a frequency synthesized rf source means connected to said transducer, and an end mirror with a coating disposed on said acoustic-wave transmitting material for reflecting radiation from said laser medium in a return path back to said laser medium;

an output mirror mounted close to a second end of said laser medium and constituting together with said acoustic-optic modulator an optical resonator having an optical axis and an optical path of length L;

means for controlling and maintaining the temperature of said acousto-optic modulator.

2. The integrated acousto-optic mode locker according to claim 1, wherein said acousto-optic modulator consisting of said:

acoustic-wave transmitting material, transducer and end mirror is a single optical element which functions as a prism for laser wavelength selection in said laser optical resonator.

3. The integrated acousto-optic mode locker according to claim 1, wherein the said acousto-optic modulator is mounted in said optical resonator thereby enabling adjustment of the length L of the resonator.

4. The integrated acousto-optic mode locker according to claim 1, wherein the body of acoustic-wave transmitting material is taken from the group consisting of quartz and glass.

5. The integrated acousto-optic mode locker according to claim 1, wherein the body of acoustic-wave transmitting material is a prism with a trapezoid base with one face disposed in said resonator optical axis at Brewster's angle.

6. The integrated acousto-optic mode locker according to claim 1 wherein the acoustic-wave generating transducer is selected from the material consisting of lithium niobate, iodate or crystalline quartz.

* * * * *